Jan. 10, 1933.   H. W. AVERY   1,893,927
FITTING FOR THREADED MEMBERS
Filed Feb. 12, 1930
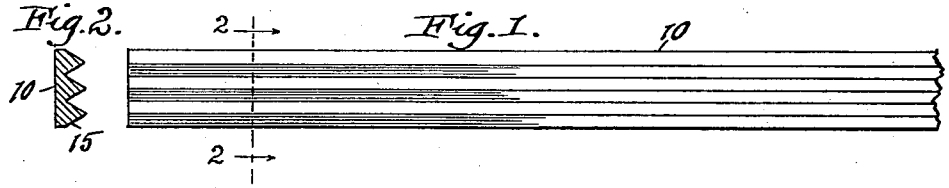
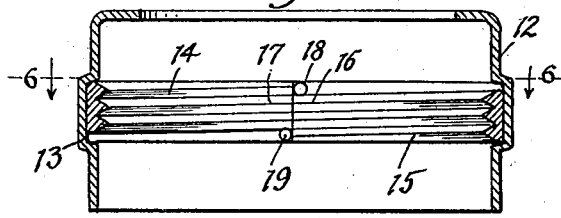
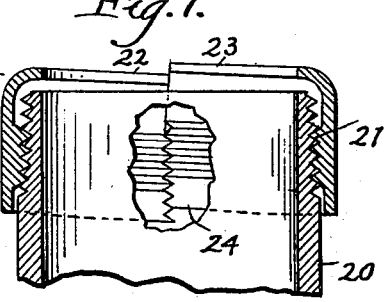
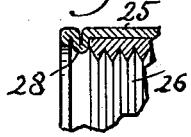
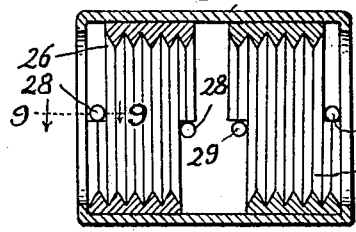
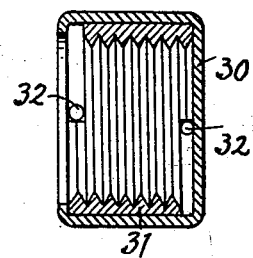
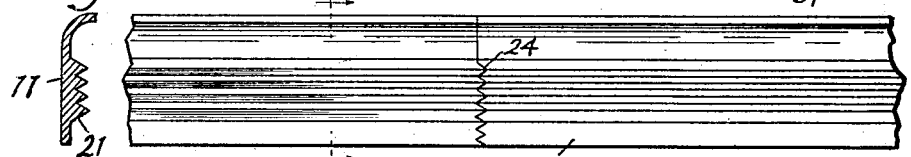
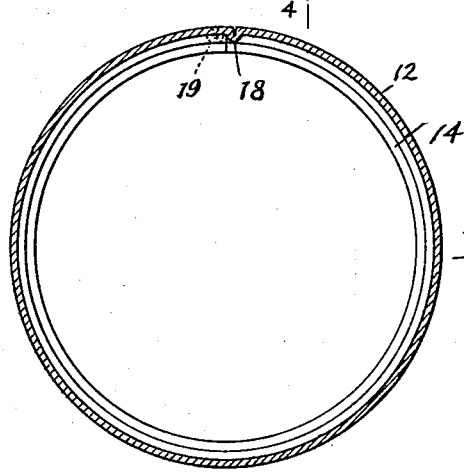
Inventor:
Henry W. Avery
Kwis Hudson & Kent
attys.

Patented Jan. 10, 1933

1,893,927

UNITED STATES PATENT OFFICE

HENRY W. AVERY, OF CLEVELAND, OHIO

FITTING FOR THREADED MEMBERS

Application filed February 12, 1930. Serial No. 427,934.

This invention relates to fittings for threaded members and has for its object the provision of a fitting in which ridges extending longitudinally of a piece of stock form the helical threads of the fitting.

Another object of this invention is to provide a fitting for threaded members having a thread engaging portion formed by bending a piece of longitudinally ridged stock to substantially circular form and maintaining the ends of said piece in offset relation.

The invention may be further briefly summarized as consisting in certain novel combinations and arrangements of parts hereinafter described and particularly set out in the appended claim.

In the accompanying sheet of drawing:

Fig. 1 is a plan view of a strip of stock used in constructing fittings according to my invention;

Fig. 2 is a sectional view taken on line 2—2 of Fig. 1;

Fig. 3 is a plan view of another strip of stock used in constructing fittings according to my invention;

Fig. 4 is a sectional view taken on line 4—4 of Fig. 3;

Fig. 5 is a longitudinal sectional view of a fitting constructed according to my invention;

Fig. 6 is a transverse sectional view taken on line 6—6 of Fig. 5;

Fig. 7 is a longitudinal sectional view showing another fitting embodying my invention and applied to a threaded member;

Fig. 8 is a longitudinal sectional view of another fitting constructed according to my invention;

Fig. 9 is a fragmentary sectional view taken on line 9—9 of Fig. 8; and

Fig. 10 is a longitudinal sectional view showing still another fitting embodying my invention.

In the drawing, to which I shall now refer in detail, I have shown several fittings for threaded members, all of which are constructed according to the principles of my invention. In Figures 1 and 3, I have shown strips of stock 10 and 11, of any suitable material, having longitudinally extending parallel ridges. In constructing fittings according to my invention, these strips of stock are cut into pieces of suitable length, depending upon the size of the threaded member to which the fitting is to be applied, and are bent to substantially circular form so that the ridges of the stock form the helical threads of the fitting.

In Fig. 5 of the drawing, I have shown a form of fitting which may be applied to the ends of pipes to protect the threaded portions during handling or shipping. This fitting comprises a tubular shell 12 having an internal annular recess 13 in which is retained a thread engaging member 14. This thread engaging member is formed from a piece of ridged stock, such as that illustrated in Fig. 1. In forming this thread engaging member the stock is cut to proper length, and after being bent to substantially circular form, is mounted in the annular groove 13. The stock which is selected to form the thread engaging member is provided with longitudinally extending ridges 15 which are spaced apart a distance corresponding with the pitch of the thread to which the finished fitting is to be applied. The abutting end portions 16 and 17 of the thread engaging member are deflected relative to each other an amount substantially equal to the pitch or spacing of the ridges 15. These end portions are maintained in the deflected or offset relation by providing suitable lugs 18 and 19, which may be formed integral with the tubular member 12, or which may be members secured to the wall of the tubular member. After offsetting the end portions of the thread engaging member, it will be readily seen that the end of each ridge aligns with the opposite end of an adjacent ridge, thus forming helical threads having a pitch corresponding with the pitch of the threads of the member to which the fitting is to be applied. The lugs 18 and 19 bear against the edges of the thread engaging member adjacent its ends, thus maintaining the end portions of this member in offset relation, and also form abutments which are engaged by the abutting end surfaces of the thread engaging member to prevent rotation of this member within the annular recess when the fitting is to be screwed onto or removed from a threaded member.

Another fitting for protecting the threads of a member, such as a pipe 20, is shown in Fig. 7 of the drawing. This fitting is formed from a piece of stock, such as that illustrated in Fig. 3. This piece of stock is provided with substantially parallel longitudinally extending ridges 21 which form helical threads when the piece of stock is bent to substantially circular form with its end portions 22 and 23 in offset relation. The stock used in constructing this fitting is preferably rolled strip stock which is thick enough to provide sufficient strength for protecting the threads of the pipe without the need of a tubular shell such as that illustrated in Fig. 5.

For facilitating the construction of this fitting and for maintaining the end portions of the member in proper offset relation, I provide teeth or serrations 24 in the ends of the piece of stock which forms this fitting. These serrations may be conveniently formed at the time the piece of material which forms the fitting is severed from the strip of stock. It will be noted that the teeth or serrations are spaced apart a distance corresponding to the spacing of the ridges which are to form the helical threads. When the end portions 22 and 23 are deflected relative to each other, they are moved a distance equal to one tooth, thus bringing the ends of the ridges into proper relation to form helical threads. The serrations thus indicate the extent to which the end portions are to be deflected, and may be employed as a means for holding these end portions in offset relation. If desired, however, the end portions may be welded or otherwise secured together with the teeth in interfitting relation.

In Fig. 8 of the drawing, I have shown another fitting which may be used as a coupling or union for joining together the ends of pipes or other threaded members. This fitting comprises a tubular shell 25 having thread engaging members 26 and 27 mounted therein. These thread engaging members are formed by bending pieces of ridged stock to substantially circular form, as described in connection with Fig. 5, and are held in place within the tubular member with their end portions in offset relation so that the ridges form helical threads. The end portions of the thread engaging member 26 are deflected so that the ridges of this member form a left-hand helical thread. The end portions of this member are maintained in proper offset relation by the pair of lugs 28 which may be formed as inwardly pressed integral lugs as illustrated in Fig. 9. These lugs also serve as abutments for preventing rotation of the thread engaging member within the tubular member when the fitting is applied to a threaded member. The thread engaging member 27 is bent to substantially circular form with its end portions in offset relation so as form a righthand thread. A pair of lugs 29 is provided for maintaining the end portions in proper offset relation and for preventing rotation of the thread engaging member within the tubular member. Obviously the thread engaging members could both be made so that the threads formed by their ridges will be righthand threads or, if desired, both of these members may be arranged to provide lefthand threads.

In Fig. 10 of the drawing, I have shown another fitting constructed according to my invention. This fitting is a pipe cap having a cup shaped casing 30 in which is mounted a thread engaging member 31. The thread engaging member is formed from a strip of ridged stock bent to substantially circular form with its end portions in offset relation as already described in connection with Figs. 5 and 8. Lugs 32 are provided for maintaining the end portions of the thread engaging member in proper offset relation, and also for preventing rotation of the thread engaging member within the casing.

It will now be readily seen that I have provided simple and efficient forms of fitting for threaded members which are provided with thread engaging portions formed by bending a piece of ridged stock so that the ridges of the stock form helical threads. Fittings constructed according to my invention can be cheaply manufactured by using rolled strip stock of any suitable material.

While I have shown and described the devices embodying my invention in a detailed manner, it should be understood, however, that I do not intend to limit myself to the precise details shown and described, but regard my invention as including such changes and modifications as do not involve a departure from the spirit of the invention and the scope of the appended claim.

Having described my invention, I claim:

In a device of the character described, the combination of a metallic sleeve having an annular recess therein, a thread engaging element in said recess comprising a length of longitudinally ridged strip stock bent to substantially circular form, said element having the ends thereof disposed in abutting laterally offset relation whereby a ridge of said length of stock forms a helical thread, and lugs carried by said sleeve and projecting into said recess, said lugs being arranged so that each lug cooperates with an end face of one end of said length and a side edge of said length adjacent the other end thereof whereby said length is held against rotation relative to said sleeve and said abutting ends are retained in laterally offset relation.

In testimony whereof, I hereunto affix my signature.

HENRY W. AVERY.